(12) United States Patent
Maeda

(10) Patent No.: US 9,854,255 B2
(45) Date of Patent: Dec. 26, 2017

(54) ELECTRONIC APPARATUS, AND METHOD AND COMPUTER-READABLE MEDIUM FOR THE SAME

(71) Applicant: BROTHER KOGYO KABUSHIKI KAISHA, Nagoya, Aichi (JP)

(72) Inventor: Jyunji Maeda, Ichinomiya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 340 days.

(21) Appl. No.: 14/669,255

(22) Filed: Mar. 26, 2015

(65) Prior Publication Data

US 2015/0281704 A1    Oct. 1, 2015

(30) Foreign Application Priority Data

Mar. 31, 2014    (JP) .................................. 2014-072514

(51) Int. Cl.
*G06K 9/00* (2006.01)
*G06K 9/36* (2006.01)
(Continued)

(52) U.S. Cl.
CPC ......... *H04N 19/186* (2014.11); *H04N 19/132* (2014.11); *H04N 19/167* (2014.11); *H04N 19/146* (2014.11)

(58) Field of Classification Search
CPC .... H04N 19/186; H04N 19/70; H04N 19/176; H04N 19/59; G06T 2207/10024
See application file for complete search history.

(56) References Cited

U.S. PATENT DOCUMENTS 5,565,996 A * 10/1996 Ueda ...................... G11B 20/00
                                                  375/E7.252
6,026,191 A    2/2000 Ohara
(Continued)

FOREIGN PATENT DOCUMENTS

JP    H07-244715 A    9/1995
JP    HEI 8-251590 A1    9/1996
(Continued)

OTHER PUBLICATIONS

Notification of Reasons for Rejection dated Feb. 7, 2017 received from the Japanese Patent Office in related counterpart application JP 2014-072514.

*Primary Examiner* — Dave Czekaj
*Assistant Examiner* — Alison Slater
(74) *Attorney, Agent, or Firm* — Scully, Scott, Murphy & Presser, PC

(57) ABSTRACT

An electronic apparatus including an input unit configured to separate image data into pixel blocks and serially input luminance data and color difference data of each pixel block as individual pieces of block data, respectively, a quantization unit configured to serially convert each piece of the block data into quantized data, an encoding unit configured to serially convert each piece of the quantized data into encoded data, a color generation unit configured to generate compressed color image data using the encoded data, and a monochrome generation unit configured to generate compressed monochrome image data using the encoded data by performing one of deleting particular pieces of encoded data corresponding to the color difference data from a data sequence of the encoded data generated through the conversion by the encoding unit, and replacing the particular pieces of encoded data with encoded data corresponding to monochrome color difference data.

20 Claims, 10 Drawing Sheets

(51) Int. Cl.
*H04N 1/40* (2006.01)
*H04N 1/41* (2006.01)
*H04N 19/186* (2014.01)
*H04N 19/132* (2014.01)
*H04N 19/167* (2014.01)
*H04N 19/146* (2014.01)

(56) References Cited

U.S. PATENT DOCUMENTS

| | | | |
|---|---|---|---|
| 6,144,763 A * | 11/2000 | Ito | H04N 5/772 348/396.1 |
| 2003/0086127 A1* | 5/2003 | Ito | H04N 1/3333 358/462 |
| 2004/0175051 A1 | 9/2004 | Inada | |
| 2006/0044576 A1 | 3/2006 | Tabata et al. | |
| 2006/0132855 A1* | 6/2006 | Dokuni | H04N 1/403 358/448 |
| 2006/0221415 A1 | 10/2006 | Kawamoto | |
| 2007/0025627 A1* | 2/2007 | Hasegawa | H04N 1/41 382/239 |
| 2009/0147287 A1* | 6/2009 | Misawa | H04N 1/56 358/1.9 |
| 2010/0027624 A1* | 2/2010 | Yu | H04N 19/00 375/240.12 |
| 2011/0096985 A1* | 4/2011 | Matsuhira | H04N 19/176 382/166 |
| 2012/0013764 A1* | 1/2012 | Sakai | H04N 9/643 348/223.1 |
| 2013/0046803 A1* | 2/2013 | Parmar | G09G 3/2048 708/203 |
| 2013/0156333 A1* | 6/2013 | Shimauchi | G06T 9/00 382/232 |
| 2013/0223732 A1* | 8/2013 | Motoyama | G06K 9/00536 382/165 |
| 2014/0237083 A1* | 8/2014 | Astudillo | H04L 67/1095 709/219 |

FOREIGN PATENT DOCUMENTS

| | | |
|---|---|---|
| JP | H11-4349 A | 1/1999 |
| JP | 2001-258030 A | 9/2001 |
| JP | 2004-180064 A | 6/2004 |
| JP | 2004-236219 A | 8/2004 |
| JP | 2005-278169 A1 | 10/2005 |
| JP | 2006-261927 A | 9/2006 |
| JP | 2011-029809 A | 2/2011 |

* cited by examiner

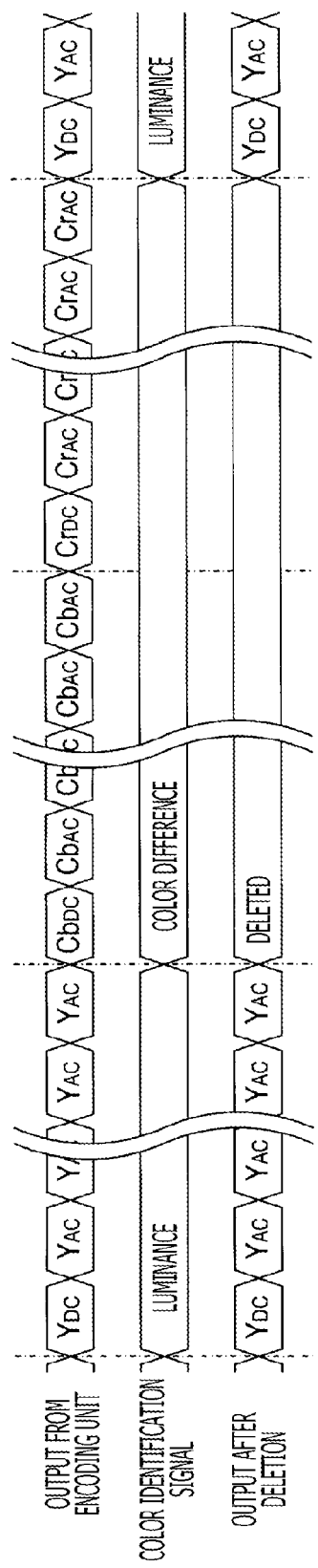

ELECTRONIC APPARATUS, AND METHOD AND COMPUTER-READABLE MEDIUM FOR THE SAME

CROSS-REFERENCE TO RELATED APPLICATION

This application claims priority under 35 U.S.C. §119 from Japanese Patent Application No. 2014-072514 filed on Mar. 31, 2014. The entire subject matter of the application is incorporated herein by reference.

BACKGROUND

Technical Field

The following description relates to one or more aspects of an electronic apparatus.

Related Art

An apparatus has been known that is configured to generate compressed image data by encoding image data. As an encoding method used for compressing image data, JPEG has been known. Further, an apparatus has been known that is configured to perform, in parallel, a process of generating compressed color image data by compressing multi-valued color image data and a process of generating image data binarized after conversion of multi-valued color image data into multi-valued black-and-white image data.

SUMMARY

The inventor has an idea about an electronic apparatus (such as an image scanner and a digital multi-function peripheral) configured to convert image data read by a reading device into compressed color image data or compressed monochrome image data. It is noted that "monochrome" referred to in the present disclosure may include the meaning of "gray scale." Further, monochrome image data may include binary monochrome image data and multi-valued monochrome image data. If the electronic apparatus is configured to provide a user with compressed color image data and compressed monochrome image data at the same time, it is possible to improve user-friendliness of the electronic apparatus.

However, according to a known technique, image data to be processed is divided into two pieces of image data at an initial stage of image processing. Then, for one of the two pieces of image data, a process of generating compressed color image data is performed. Further, for the other piece of image data, a process of generating compressed monochrome image data is performed. Hence, the known technique has a problem that it is not possible to efficiently generate the compressed color image data and the compressed monochrome image data, since a lot of operations are redundantly performed between the two processes.

Aspects of the present disclosure are advantageous to provide one or more improved techniques, for an electronic apparatus, which make it possible to more efficiently generate compressed color image data and compressed monochrome image data than the known technique.

According to aspects of the present disclosure, an electronic apparatus is provided that includes an input unit configured to separate target image data into a plurality of pixel blocks, and serially input luminance data and color difference data of each pixel block as individual pieces of block data, respectively, a quantization unit configured to serially convert, into quantized data, each piece of the block data input from the input unit, via execution of frequency conversion and quantization for each piece of the block data, an encoding unit configured to serially convert, into encoded data, each piece of the quantized data generated through the conversion by the quantization unit, via entropy encoding of each piece of the quantized data, a color generation unit configured to generate compressed color image data corresponding to the target image data, using the encoded data generated through the conversion by the encoding unit, and a monochrome generation unit configured to generate compressed monochrome image data corresponding to the target image data, using the encoded data generated through the conversion by the encoding unit, by performing one of deleting particular pieces of encoded data corresponding to the color difference data from a data sequence of the encoded data generated through the conversion by the encoding unit, and replacing the particular pieces of encoded data corresponding to the color difference data with encoded data corresponding to monochrome color difference data.

According to aspects of the present disclosure, further provided is a method adapted to be implemented on an electronic apparatus, the method including separating target image data into a plurality of pixel blocks, serially inputting luminance data and color difference data of each pixel block as individual pieces of block data, respectively, serially converting each piece of the block data into quantized data via execution of frequency conversion and quantization for each piece of the block data, serially converting each piece of the quantized data into encoded data via entropy encoding of each piece of the quantized data, generating compressed color image data corresponding to the target image data, using the encoded data, and generating compressed monochrome image data corresponding to the target image data, using the encoded data, by performing one of deleting particular pieces of encoded data corresponding to the color difference data from a data sequence of the encoded data generated through the entropy encoding of each piece of the quantized data, and replacing the particular pieces of encoded data corresponding to the color difference data with encoded data corresponding to monochrome color difference data.

According to aspects of the present disclosure, further provided is a non-transitory computer-readable medium storing computer-readable instructions configured to, when executed by a processor, cause the processor to separate target image data into a plurality of pixel blocks, serially input luminance data and color difference data of each pixel block as individual pieces of block data, respectively, serially convert each piece of the block data into quantized data via execution of frequency conversion and quantization for each piece of the block data, serially convert each piece of the quantized data into encoded data via entropy encoding of each piece of the quantized data, generate compressed color image data corresponding to the target image data, using the encoded data, and generate compressed monochrome image data corresponding to the target image data, using the encoded data, by performing one of deleting particular pieces of encoded data corresponding to the color difference data from a data sequence of the encoded data generated through the entropy encoding of each piece of the quantized data, and replacing the particular pieces of encoded data corresponding to the color difference data with encoded data corresponding to monochrome color difference data.

BRIEF DESCRIPTION OF THE ACCOMPANYING DRAWINGS

Figure 3A:
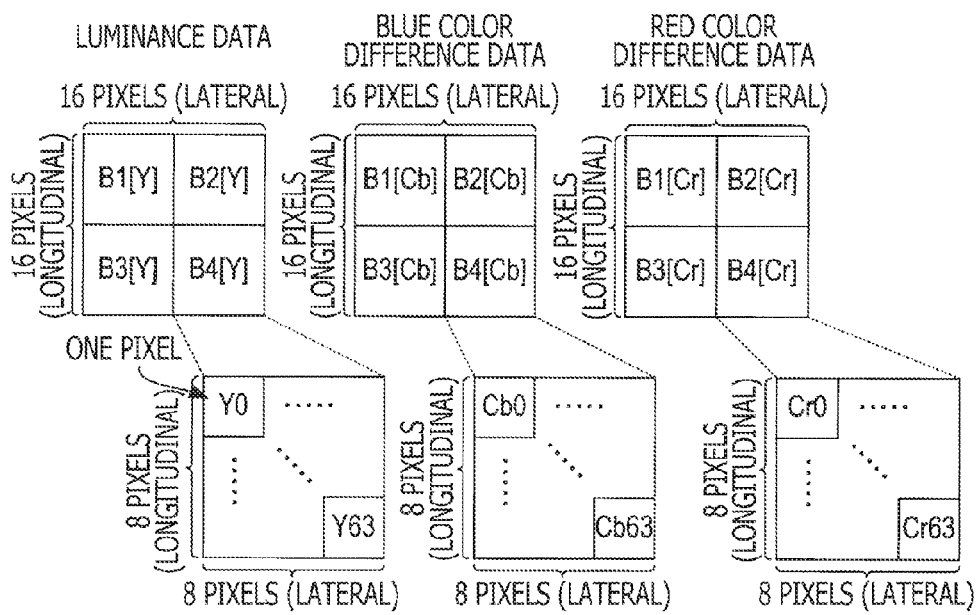

FIG. 3A schematically shows how each of luminance data, blue color difference data, and red color difference data included in image data is separated into pixel blocks, in the first illustrative embodiment according to one or more aspects of the present disclosure.

Figure 3B:
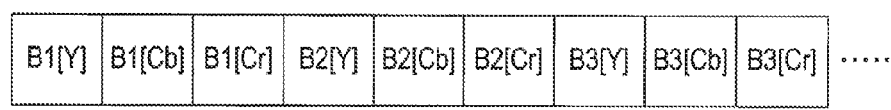
Figure 3C:
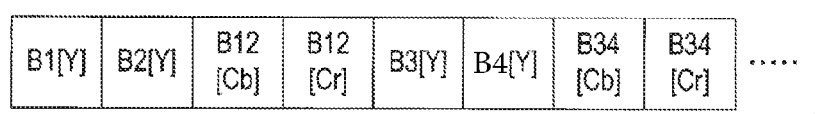
Figure 3D:
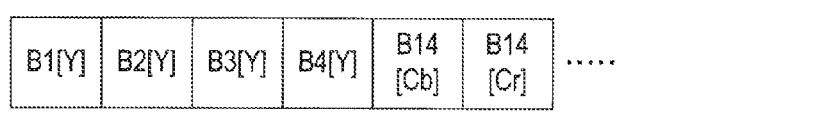

FIGS. 3B, 3C, and 3D show respective input sequences in which each block data in three different formats (a 4:4:4 format, a 4:2:2 format, and a 4:2:0 format) is input from an input unit, in the first illustrative embodiment according to one or more aspects of the present disclosure.

Figure 4:
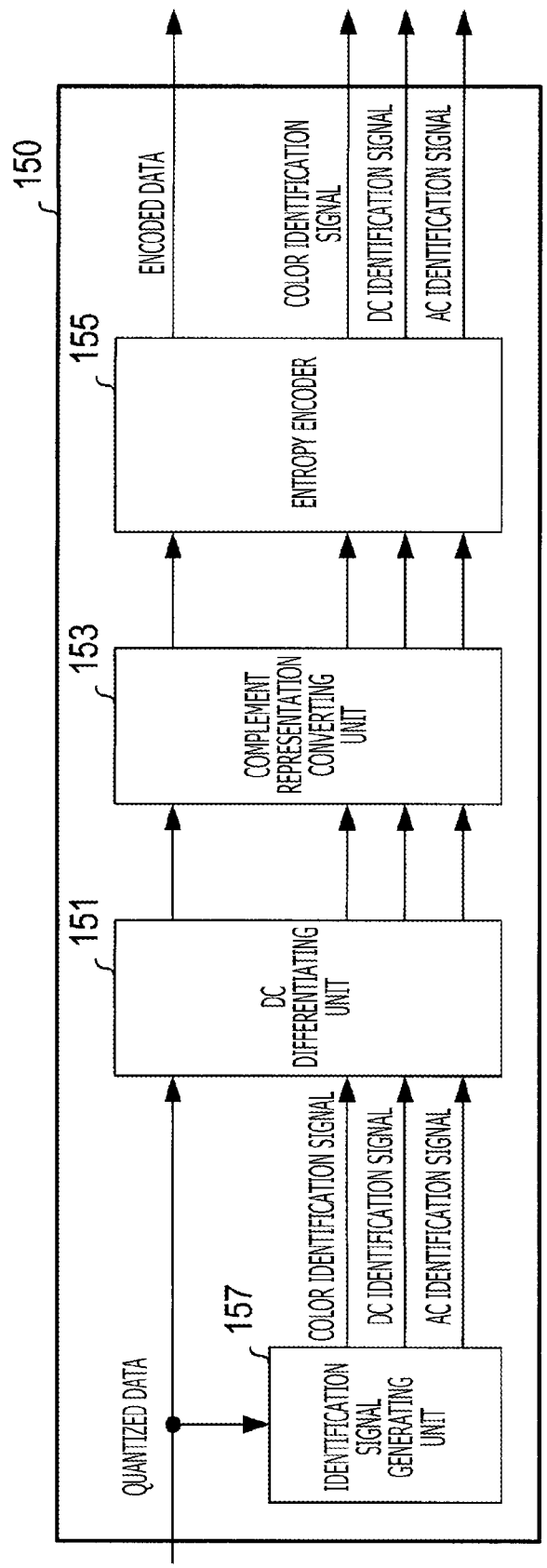

FIG. 4 is a block diagram showing a configuration of an encoding unit in the first illustrative embodiment according to one or more aspects of the present disclosure.

Figure 5:
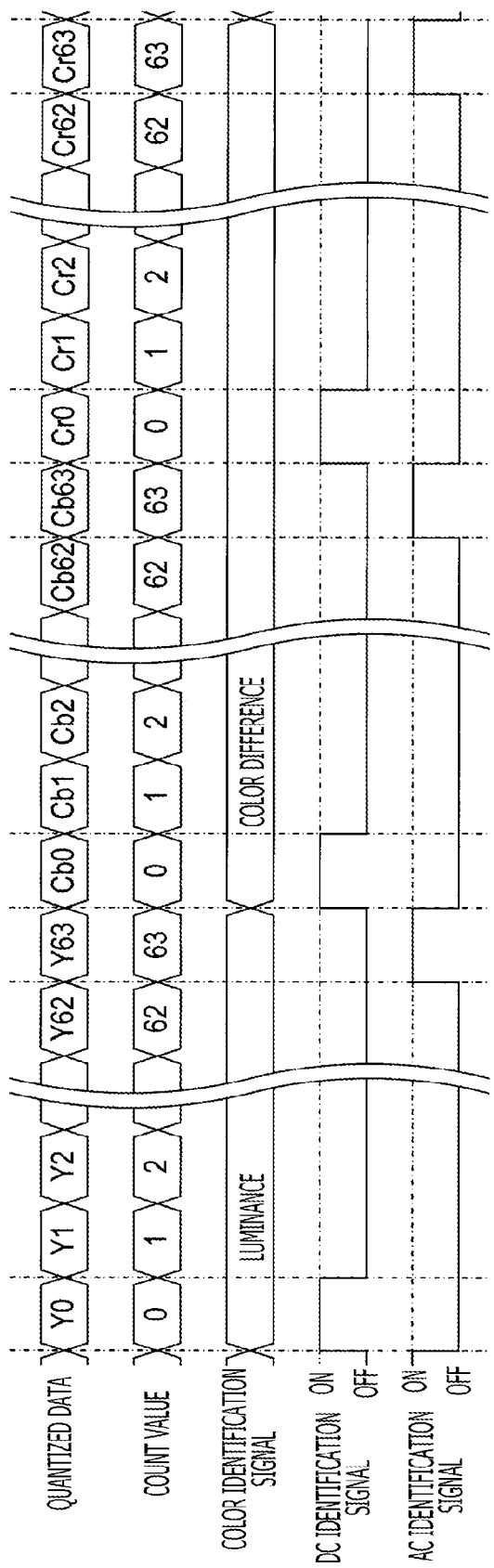

FIG. 5 is a time chart showing a relationship among a datastream of quantized data, a count value, and identification signals, in the first illustrative embodiment according to one or more aspects of the present disclosure.

Figure 6:
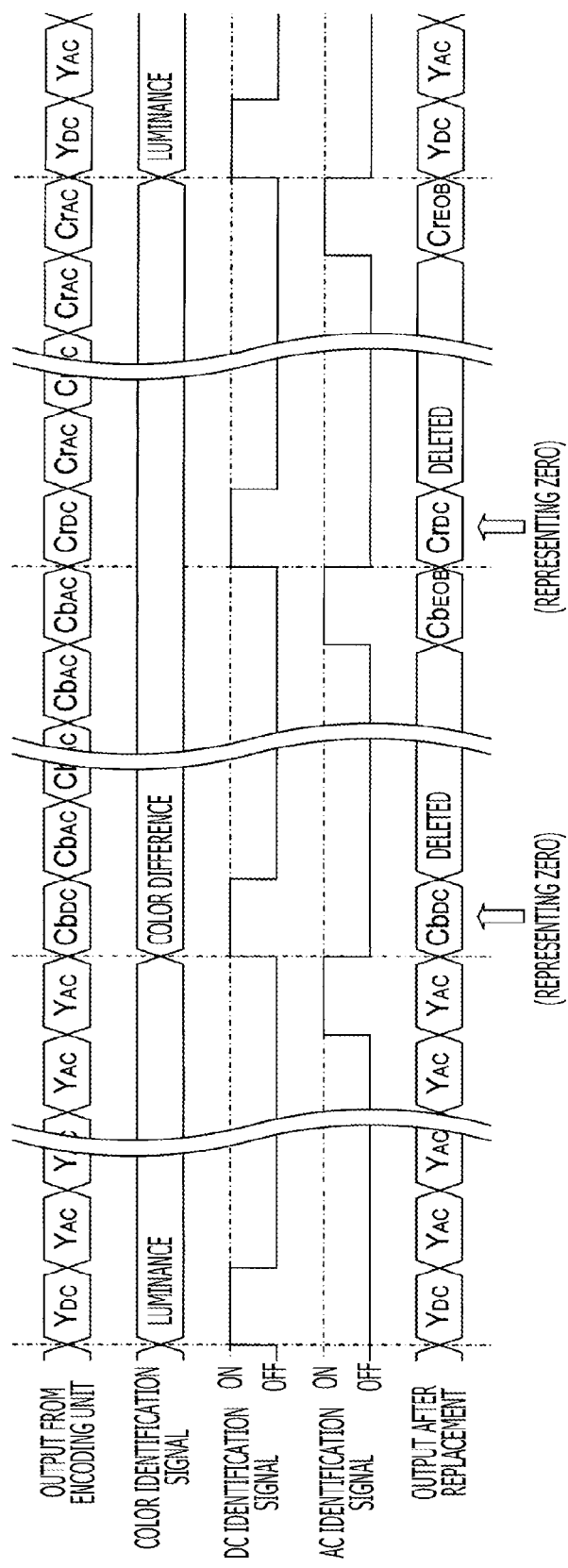

FIG. 6 is a time chart showing a relationship among a data sequence output from the encoding unit, the identification signals, and a data sequence output from a color difference replacement unit, in the first illustrative embodiment according to one or more aspects of the present disclosure.

Figure 7:
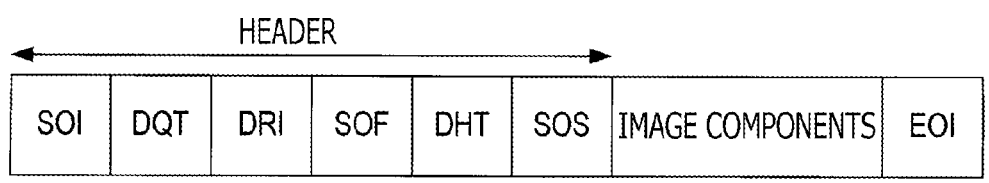

FIG. 7 schematically shows a data structure of compressed image data in the first illustrative embodiment according to one or more aspects of the present disclosure.

Figure 8:
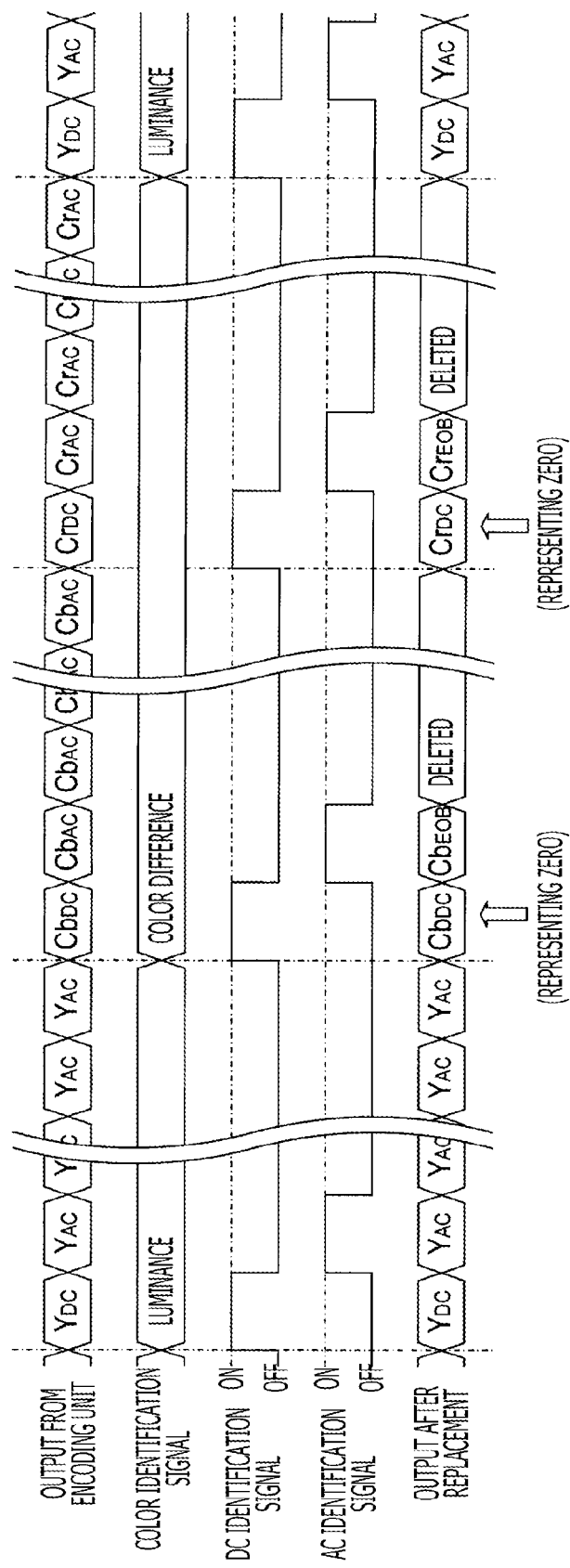

FIG. 8 is a time chart showing a relationship among a data sequence output from an encoding unit, identification signals, and a data sequence output from a color difference replacement unit, in a second illustrative embodiment according to one or more aspects of the present disclosure.

Figure 9:
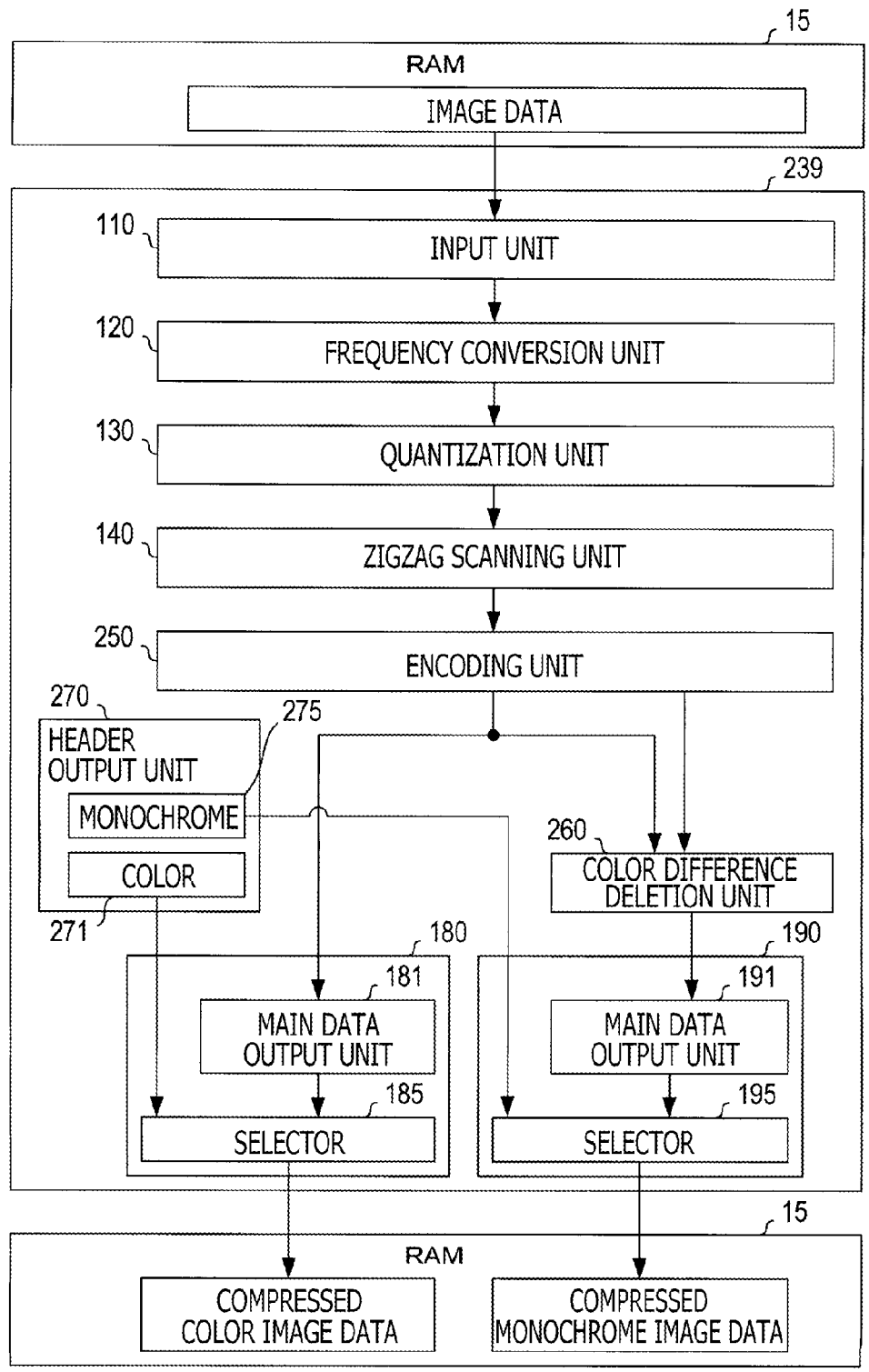

FIG. 9 is a block diagram showing a configuration of a JPEG compressing circuit in a third illustrative embodiment according to one or more aspects of the present disclosure.

FIG. 10 is a time chart showing a relationship among a data sequence output from an encoding unit, a color identification signal, and a data sequence output from a color difference deletion unit, in the third illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

[First Illustrative Embodiment]

Figure 1:
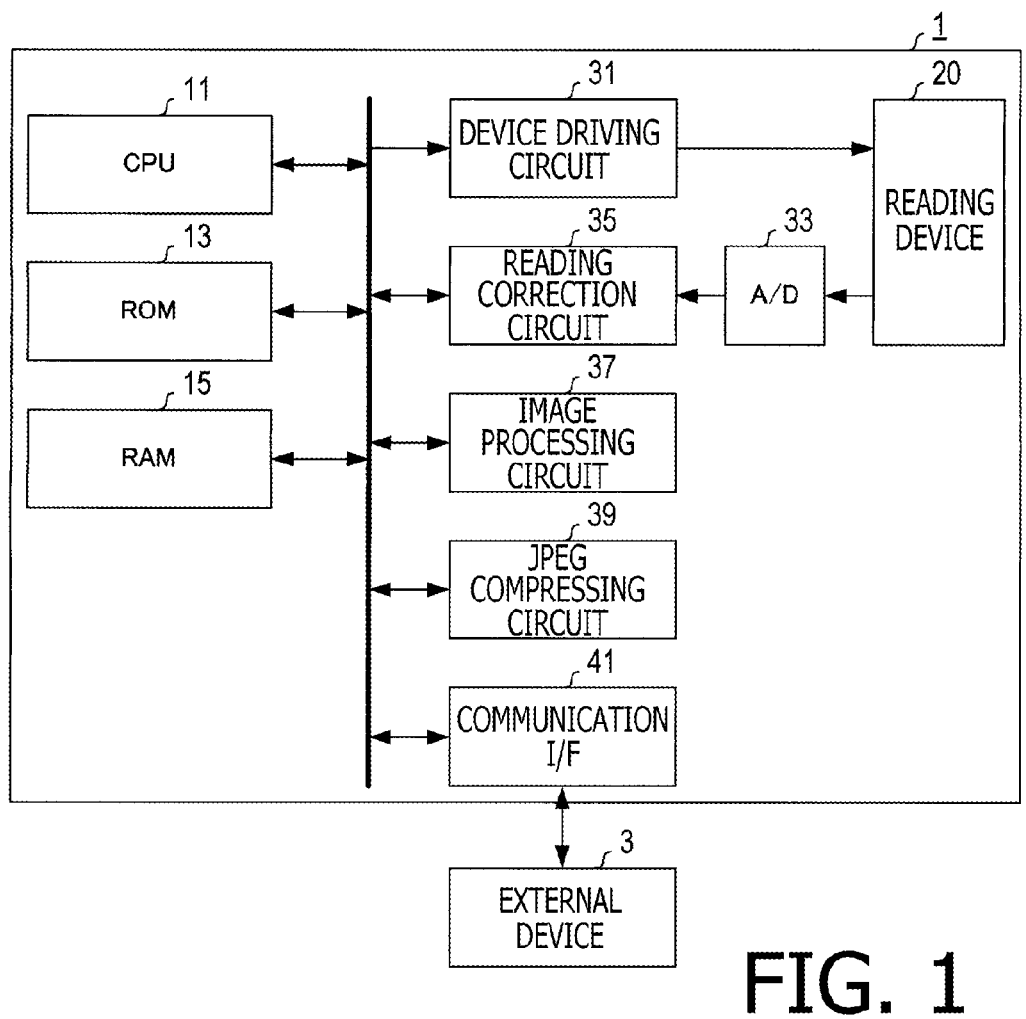
FIG. 1 is a block diagram showing a configuration of an image reader in a first illustrative embodiment according to one or more aspects of the present disclosure.

In a first illustrative embodiment, an image reader 1 shown in FIG. 1 is configured as a flatbed type image scanner or an automatic document feeder type image scanner. The image reader 1 is configured to convert image data (which expresses a read image of a document sheet) generated by a reading device 20 into compressed color image data and compressed monochrome image data. The compressed color image data and the compressed monochrome image data are generated as JPEG compressed image data, and are provided to an external device 3 such as a personal computer.

The image reader 1 may be configured as a digital multi-function peripheral having a plurality of functions such as a scanning function, a printing function, a copy function, and a facsimile function. In this case, the image reader 1 may achieve a color copy function or a monochrome copy function by printing the read image of the document sheet based on the compressed color image data or the compressed monochrome image data. Furthermore, the image reader 1 may achieve a facsimile function of transmitting facsimile data based on the compressed image data to an external facsimile machine.

As shown in FIG. 1, the image reader 1 of the first illustrative embodiment includes a CPU 11, a ROM 13, a RAM 15, the reading device 20, a device driving circuit 31, an A/D convertor 33, a reading correction circuit 35, an image processing circuit 37, a JPEG compressing circuit 39, and a communication interface 41.

The CPU 11, the ROM 13, the RAM 15, the reading device 20, the device driving circuit 31, the A/D convertor 33, the reading correction circuit 35, the image processing circuit 37, the JPEG compressing circuit 39, and the communication interface 41 are interconnected via a bus. The image reader 1 may further include a user interface (not shown). In this case, the image reader 1 may be configured to accept a user operation via the user interface. Further, the image reader 1 may be configured to output various sorts of displays and/or sounds to provide information and/or notifications to the user.

The CPU 11 is configured to, when executing processes according to programs stored in the ROM 13, control each element included in the image reader 1 and achieve various kinds of functions. The RAM 15 is used as a work area during execution of the processes by the CPU 11.

The reading device 20 includes a color image sensor and a conveyance mechanism. The conveyance mechanism is configured to convey a document sheet and/or move the image sensor. The reading device 20 is configured to, by operating the image sensor and the conveyance mechanism, perform an operation of moving the image sensor along the document sheet and reading the document sheet and/or an operation of conveying the document sheet to a reading position of the image sensor and reading the document sheet. Color image data (which expresses a read image of the document sheet) generated by the reading device 20 is converted from analog data into digital data by the A/D convertor 33 and then transmitted to the reading correction circuit 35.

The device driving circuit 31 is configured to drive and control the reading device 20 in accordance with instructions from the CPU 11, and thereby control an operation of reading the document sheet by the image sensor and a conveyance operation by the conveyance mechanism.

The reading correction circuit 35 is configured to perform various types of reading correction (such as shading correction) for the image data received from the A/D convertor 35. The image data corrected by the reading correction circuit 35 is stored into the RAM 15.

The image processing circuit 37 converts the image data, which has been output from the reading correction circuit 35 and stored in the RAM 15, from the image data of an RGB color system into image data of a YCbCr color system. Namely, the image processing circuit 37 is configured to convert image data of the RGB color system into image data of the YCbCr color system that has luminance data expressing a luminance Y of each pixel, blue color difference data expressing a blue color difference Cb of each pixel, and red color difference data expressing a red color difference Cr of each pixel. The image data of the YCbCr color system is stored into the RAM 15.

The JPEG compressing circuit 39 is configured to perform JPEG compression for the image data of the YCbCr color system stored in the RAM 15 and generate compressed color image data and compressed monochrome image data. The compressed color image data and the compressed monochrome image data are stored into the RAM 15.

The communication interface 41 is configured to achieve communication between the image reader 1 and the external device 3. For instance, the communication interface 41 is controlled by the CPU 11 to transmit the compressed image data stored in the RAM 15 to the external device 3. Further, the communication interface 41 receives various instructions from the external device 3 and transmits the received instructions to the CPU 11.

For instance, when a reading instruction from the external device 3 is input via the communication interface 41, the CPU 11 controls the reading device 20 via the device driving circuit 31 and causes the reading device 20 to generate image data expressing the read image of the document sheet. Further, the CPU 11 acquires compressed color image data and compressed monochrome image data corresponding to the generated image data via the reading correction circuit 35, the image processing circuit 37, and the JPEG compressing circuit 39, and provides the acquired pieces of compressed image data to the external device 3.

Subsequently, a detailed configuration of the JPEG compressing circuit 39 will be described. According to instructions from the CPU 11, the JPEG compressing circuit 39 reads out, from the RAM 15, the image data of the YCbCr color system as image data to be processed. Then, the JPEG compressing circuit 39 converts the image data of the YCbCr color system into the compressed color image data and the compressed monochrome image data. The compressed color image data and the compressed monochrome image data generated through the conversion are stored into the RAM 15.

Figure 2:
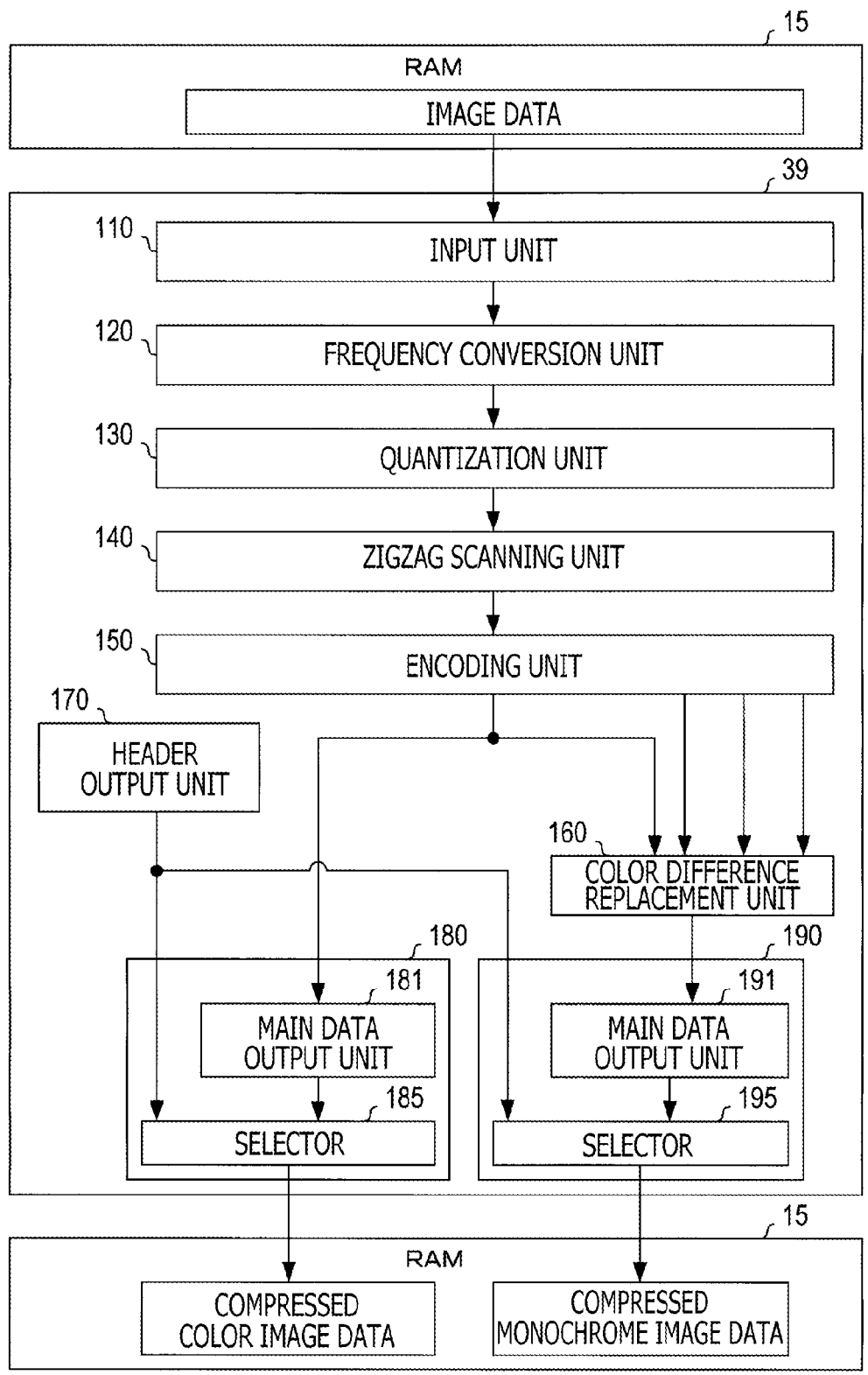
FIG. 2 is a block diagram showing a configuration of a JPEG compressing circuit in the first illustrative embodiment according to one or more aspects of the present disclosure.

As shown in FIG. 2, the JPEG compressing circuit 39 includes an input unit 110, a frequency conversion unit 120, a quantization unit 130, a zigzag scanning unit 140, an encoding unit 150, a color difference replacement unit 160, a header output unit 170, a color output unit 180, and a monochrome output unit 190.

The input unit 110 separates each of luminance data, blue color difference data, and red color difference data included in the image data to be processed (that is stored in the RAM 15), into predetermined pixel blocks. Then, the input unit 110 sequentially inputs, into the frequency conversion unit 120, the luminance data, the blue color difference data, and the red color difference data as block data. In the following description, block data of each pixel block that corresponds to luminance data will be referred to as luminance block data. In addition, block data of each pixel block that corresponds to blue color difference data will be referred to as blue color difference block data. Further, block data of each pixel block that corresponds to red color difference data will be referred to as red color difference block data.

When a known 4:4:4 format is employed as a compression method, the input unit 100 separates each of the luminance data, the blue color difference data, and the red color difference data included in the image data to be processed, into pixel blocks each configured with 8 pixels (longitudinal)×8 pixels (lateral), as shown in FIG. 3A. Then, the input unit 100 inputs, into the frequency conversion unit 120, the separated luminance data, the separated blue color difference data, and the separated red color difference data.

In other words, the input unit 110 inputs, into the frequency conversion unit 120, luminance block data having luminance values (Y) of 64 pixels, blue color difference block data having blue color difference values (Cb) of 64 pixels, and red color difference block data having red color difference values (Cr) of 64 pixels, for each pixel block.

As shown in FIG. 3A, via the processing by the input unit 110, an area of 16 pixels (longitudinal)×16 pixels (lateral) in the image data to be processed is separated into four pieces of luminance block data B1[Y], B2[Y], B3[Y], and B4[Y], four pieces of blue color difference block data B1[Cb], B2[Cb], B3[Cb], and B4[Cb], and four pieces of red color difference block data B1[Cr], B2[Cr], B3[Cr], and B4[Cr]. Then, these pieces of block data are input into the frequency conversion unit 120 in an arrangement order shown in FIG. 3B.

FIG. 3A shows the pixel blocks within the area of 16 pixels (longitudinal)×16 pixels (lateral) in the 4:4:4 format. FIG. 3B shows an input sequence in which each block data in the 4:4:4 format is input into the frequency conversion unit 120. In the 4:4:4 format, initially, luminance block data B1[Y], blue color difference block data B1[Cb], and red color difference block data B1[Cr] of a first pixel block are serially input. Thereafter, luminance block data B2[Y], blue color difference block data B2[Cb], and red color difference block data B2[Cr] of a second pixel block (next to the first pixel block) are serially input. Namely, the luminance block data, the blue color difference block data, and the red color difference block data are serially input on the basis of each pixel block.

In this regard, however, it is noted that FIG. 3B exemplifies the input sequence under an assumption that the image data to be processed only contains 16 pixels (longitudinal)×16 pixels (lateral). When the image data to be processed has "8×M" pixels in the lateral direction, initially, luminance block data, blue color difference block data, and red color difference block data regarding "M" pixel blocks laterally arranged in a first line are input. Thereafter, luminance block data, blue color difference block data, and red color difference block data regarding "M" pixel blocks in a second line are input.

When a known 4:2:2 format is employed as a compression method, the input unit 100 separates the luminance data included in the image data to be processed, into pixel blocks each configured with 8 pixels (longitudinal)×8 pixels (lateral). Then, the input unit 100 inputs the separated luminance data into the frequency conversion unit 120 as luminance block data. Further, the input unit 100 separates each of the blue color difference data and the red color difference data included in the image data to be processed, into pixel blocks each configured with 8 pixels (longitudinal)×16 pixels (lateral). Then, the input unit 100 thins values in each pixel block and generates blue color difference block data of 8 pixels (longitudinal)×8 pixels (lateral) and red color difference block data of 8 pixels (longitudinal)×8 pixels (lateral). Thereafter, the input unit 100 inputs the generated blue color difference block data and the generated red color difference block data into the frequency conversion unit 120.

FIG. 3C shows an input sequence in which each block data in the 4:2:2 format is input into the frequency conversion unit 120. In the 4:2:2 format, each block data is input into the frequency conversion unit 120 in the following sequence, i.e., luminance block data B1[Y] of a first pixel block, luminance block data B2[Y] of a second pixel block, blue color difference block data B12[Cb] corresponding to the first pixel block and the second pixel block, red color difference block data B12[Cr] corresponding to the first pixel block and the second pixel block, luminance block data B3 [Y] of a third pixel block, luminance block data B4[Y] of a fourth pixel block, blue color difference block data B34[Cb] corresponding to the third pixel block and the fourth pixel block, and red color difference block data B34[Cr] corresponding to the third pixel block and the fourth pixel block.

Further, when a known 4:2:0 format is employed as a compression method, the input unit 100 separates the luminance data included in the image data to be processed, into pixel blocks each configured with 8 pixels (longitudinal)×8 pixels (lateral). Then, the input unit 100 inputs the separated luminance data into the frequency conversion unit 120 as luminance block data. In addition, the input unit 100 separates each of the blue color difference data and the red color difference data included in the image data to be processed, into pixel blocks each configured with 16 pixels (longitudinal)×16 pixels (lateral). Then, the input unit 100 thins values in each pixel block and generates blue color difference block data of 8 pixels (longitudinal)×8 pixels (lateral) and red color difference block data of 8 pixels (longitudinal)×8 pixels (lateral). Thereafter, the input unit 100 inputs the generated blue color difference block data and the generated red color difference block data into the frequency conversion unit 120.

FIG. 3D shows an input sequence in which each block data in the 4:2:0 format is input into the frequency conversion unit 120. As understood from FIG. 3D, in the 4:2:0 format, each block data is input into the frequency conversion unit 120 in the following sequence, i.e., respective pieces of luminance block data B1[Y], B2[Y], B3[Y], and B4[Y] of first to fourth pixel blocks, blue color difference block data B14[Cb] corresponding to the first to fourth pixel blocks, and red color difference block data B14[Cr] corresponding to the first to fourth pixel blocks.

Each block data from the input unit 110 is processed in the input sequence in a pipeline processing system, in the frequency conversion unit 120, the quantization unit 130, the zigzag scanning unit 140, and the encoding unit 150. Thereby, each block data is entropy-encoded. Hereinafter, an explanation will be provided mainly about a process when the 4:4:4 format is employed.

The frequency conversion unit 120 performs discrete cosine transformation (hereinafter, which may be referred to as "DCT") for each block data input from the input unit 110. Thereafter, the frequency conversion unit 120 inputs each DCT-transformed block data into the quantization unit 130. By the discrete cosine transformation (DCT), each block data is transformed into space frequency data having an 8×8 two-dimensional DCT coefficient. Each value of the 8×8 two-dimensional DCT coefficient represents a ratio of a corresponding one of frequency components contained in the pixel block. The 8×8 two-dimensional DCT coefficient has one direct-current (DC) component value and 63 alternate-current (AC) component values.

The quantization unit 130 quantizes each piece of the DCT-transformed block data with a quantization table. Then, the quantization unit 130 inputs each quantized block data into the zigzag scanning unit 140. Each quantized block data has one quantized DC component value and 63 quantized AC component values. In the following description, each quantized DC component value may be referred to as DC component data. In addition, each quantized AC component value may be referred to as AC component data. Further, each piece of the DC component data and the AC component data may be referred to as quantized data.

The zigzag scanning unit 140 converts each quantized block data input from the quantization unit 130 into a one-dimensional data row, and inputs each one-dimensional data row into the encoding unit 150. Namely, the zigzag scanning unit 140 inputs, into the encoding unit 150, the one piece of DC component data and the 63 pieces of AC component data as a one-dimensional data row in which the one piece of DC component data is followed by the 63 pieces of AC component data arranged in ascending order of frequency.

The encoding unit 150 entropy-encodes each quantized data (each of the one piece of DC component data and the plurality of pieces of AC component data) input from the zigzag scanning unit 140, to be converted into encoded data. Then, the encoding unit 150 allocates (inputs) a bitstream of the encoded data to each of the color output unit 180 and the color replacement unit 160. Thus, by such allocating of the encoded data, one of the same two bitstreams is provided to the color output unit 180, and the other bitstream is provided to the monochrome output unit 190 via the color difference replacement unit 160.

Subsequently, the encoding unit 150 will be described in detail. As shown in FIG. 4, the encoding unit 150 includes a DC differentiating unit 151, a complement representation converting unit 153, an entropy encoder 155, and an identification signal generating unit 157.

The DC differentiating unit 151 performs a known DC differentiating process for each quantized data input from the zigzag scanning unit 140. The DC differentiating unit 151 performs the DC differentiating process by replacing a piece of DC component data of the input quantized data with a difference value from another piece of DC component data corresponding to a previous pixel block that is one block ahead in the arrangement order. The quantized data generated through the DC differentiating process by the DC differentiating unit 151 is input into the complement representation converting unit 153.

The complement representation converting unit 153 converts the quantized data resulting from the process by the DC differentiating unit 151 into a one's complement representation. Each quantized data from the zigzag scanning unit 140 is data with the DCT coefficient represented in two's complement notation. The complement representation converting unit 153 converts the DCT coefficient of each quantized data into a one's complement representation, and inputs the data generated through the conversion, into the entropy encoder 155.

The entropy encoder 155 serially entropy-encodes each quantized data input from the complement representation converting unit 153 with a Huffman table. Then, the entropy encoder 155 outputs a bitstream of the encoded data. The entropy encoding with a Huffman table has been known in a field of JPEG compression technology. Hence, a detailed explanation thereon will be omitted.

Further, the identification signal generating unit 157 generates identification signals in synchronization with the datastream of quantized data from the zigzag scanning unit 140, based on the quantized data input from the zigzag scanning unit 140. The identification signal generating unit 157 inputs the generated identification signals into the DC differentiating unit 151.

Specifically, the identification signal generating unit 157 generates, as the identification signals, a color identification signal, a DC identification signal, and an AC identification signal, and inputs these generated identification signals into the DC differentiating unit 151. As shown in FIG. 5, the color identification signal is a signal for identifying a luminance area and a color difference area in the datastream of quantized data. The luminance area referred to here is an area corresponding to the luminance block data. The color difference area is an area corresponding to the blue color difference block data or the red color difference block data.

A sequence of Y0, Y1, . . . , Y63 shown in the uppermost chart of FIG. 5 is a datastream of quantized data corresponding to the luminance block data, and represents a datastream of DC component data (Y0) and AC component data (Y1, . . . , Y63). Likewise, a sequence of Cb0, Cb1, . . . , Cb63 is a datastream of quantized data corresponding to the blue color difference block data, and represents a datastream of DC component data (Cb0) and AC component data (Cb1, . . . , Cb63). Further, a sequence of Cr0, Cr1, . . . , Cr63 is a datastream of quantized data corresponding to the red color difference block data, and represents a datastream of DC component data (Cr0) and AC component data (Cr1, . . . , Cr63).

When quantized data of the luminance block data is input into the DC differentiating unit 151 from the zigzag scanning unit 140, the identification signal generating unit 157 inputs, into the DC differentiating unit 151, a color identification signal representing that the quantized data is in the luminance area.

When quantized data of one of the blue color difference block data and the red color difference block data is input into the DC differentiating unit 151 from the zigzag scanning unit 140, the identification signal generating unit 157 inputs, into the DC differentiating unit 151, a color identification signal representing that the quantized data is in the color difference area. The color identification signal may identify the luminance area and the color difference area with ON and OFF signals.

The DC identification signal is a signal for identifying a DC area in the datastream of quantized data. The DC area referred to here is an area corresponding to the DC component data. The identification signal generating unit 157 generates, as the DC identification signal, a signal that takes an ON state when the DC component data is input into the DC differentiating unit 151 from the zigzag scanning unit 140 and takes an OFF state when data other than the DC component data is input into the DC differentiating unit 151 from the zigzag scanning unit 140. Then, the identification signal generating unit 157 inputs the generated DC identification signal into the DC differentiating unit 151.

The AC identification signal is a signal for identifying a particular part (hereinafter referred to as a particular AC area) of an AC area corresponding to the AC component data in the datastream of quantized data. More specifically, the particular AC area referred to here is an area corresponding to the last piece of AC component data in the data sequence of each block data. The identification signal generating unit 157 generates, as the AC identification signal, a signal that takes the ON state when the last piece of AC component data in the data sequence in each block data is input into the DC differentiating unit 151 and takes the OFF state when data other than the last piece of AC component data in the data sequence in each block data is input into the DC differentiating unit 151. Then, the identification signal generating unit 157 inputs the generated AC identification signal into the DC differentiating unit 151.

The zigzag scanning unit 140 inputs, into the encoding unit 150, the luminance block data, the blue color difference block data, and the red color difference block data received from the input unit 110, as the quantized data in a previously determined order.

Further, each block data is configured with 64 (8×8) pieces of quantized data. Additionally, the zigzag scanning unit 140 inputs, into the encoding unit 150, one piece of DC component data followed by 63 pieces of AC component data. Each piece of quantized data has a fixed length. Thus, the datastream of quantized data from the zigzag scanning unit 140 is a datastream of various sorts of quantized data regularly arranged.

Accordingly, the identification signal generating unit 157 counts from zero the number of pieces of quantized data input from the zigzag scanning unit 140. Then, at a point of time when the count value changes from 63 to 64, the identification signal generating unit 157 resets the count value to zero and determines that the corresponding block data has changed to a next piece of block data.

Then, when the count value has changed to zero, the identification signal generating unit 157 determines that the input piece of quantized data is DC component data. Meanwhile, when the count value has changed to 63, the identification signal generating unit 157 determines that the input piece of quantized data is the last piece of AC component data in the data sequence in the current block data. Thereby, the identification signal generating unit 157 changes the state (ON/OFF) of the color identification signal, the DC identification signal, and the AC identification signal based on the count value. Thus, the identification signal generating unit 157 generates the color identification signal for identifying the luminance area and the color difference area, the DC identification signal for identifying the DC area, and the AC identification signal for identifying the particular AC area, and inputs the generated signals into the DC differentiating unit 151.

The DC differentiating unit 151 transmits the color identification signal, the DC identification signal, and the AC identification signal received from the identification signal generating unit 157, to the complement representation converting unit 153 as signals synchronized with the datastream of quantized data resulting from the DC differentiating process.

The complement representation converting unit 153 transmits the color identification signal, the DC identification signal, and the AC identification signal received from the DC differentiating unit 151, to the entropy encoder 155 as signals synchronized with the datastream of quantized data generated through the conversion into the one's complement representation.

The entropy encoder 155 inputs the color identification signal, the DC identification signal, and the AC identification signal received from the complement representation converting unit 153, into the color difference replacement unit 160 as signals synchronized with the bitstream of encoded data, in parallel with the bitstream of encoded data.

The entropy encoder 155 converts quantized data having a fixed length into encoded data having an unfixed length. Therefore, the color difference replacement unit 160 is not allowed to discriminate an area for each piece of encoded data contained in the bitstream from other areas, only based on the bitstream of encoded data.

On the contrary, in the first illustrative embodiment, in response to encoding of the quantized data, the entropy encoder 155 transforms the identification signals received from the complement representation converting unit 153 (such as the color identification signal, the DC identification signal, and the AC identification signal) into signals conforming to the encoded data. Then, the entropy encoder 155 outputs the identification signals resulting from the transformation as signals synchronized with the bitstream of encoded data.

Owing to the operations by the entropy encoder 155, the color identification signal is output as a signal for identifying the luminance area and the color difference area in the bitstream of encoded data. In addition, the DC identification signal is output as a signal for identifying the DC area in the bitstream of encoded data. Further, the AC identification signal is output as a signal for identifying the particular AC area (i.e., the area corresponding to the last piece of AC component data in the data sequence of each block data) in the bitstream of encoded data.

Accordingly, based on the identification signals, the color replacement unit 160 is allowed to identify the luminance area, the color difference area, the DC area, and the particular AC area (i.e., the area corresponding to the last piece of AC component data in the data sequence of each block data), in the bitstream of encoded data.

Specifically, based on the color identification signal, the DC identification signal, and the AC identification signal input from the entropy encoder 155, the color difference replacement unit 160 identifies the color difference area in the bitstream of encoded data input from the entropy encoder 155. Then, the color difference replacement unit 160 performs an operation of replacing the encoded data in the identified color difference area with codes corresponding to monochrome color difference data. With respect to areas other than the identified color difference area in the bitstream of encoded data input from the entropy encoder 155, the color difference replacement unit 160 transmits downstream the encoded data in the other areas without performing the replacing operation for the encoded data in the other areas.

Specifically, the color difference replacement unit 160 identifies areas, in the bitstream of encoded data, which are identified as the color difference areas by the color identification signal and in which the DC identification signal is in the ON state, as DC areas of the blue color difference block data or the red color difference block data. Then, as shown in FIG. 6, the color difference replacement unit 160 replaces each of the identified DC areas ($Cb_{DC}$ and $Cr_{DC}$) with encoded data representing that a DC component is zero, and transmits the data resulting from the replacement downstream.

Furthermore, the color difference replacement unit 160 deletes areas ($Cb_{AC}$ and $Cr_{AC}$) following the identified DC areas up to immediately before the AC identification signal changes to the ON state. Thereby, the color difference replacement unit 160 abandons codes (encoded data), outside the particular AC area, in each AC area within the color difference area of the bitstream, without transmitting the codes downstream. It is noted that the particular AC area is an area corresponding to the last piece of AC component data in the data sequence of each block data.

Then, when the AC identification signal has changed to the ON state, the color replacement unit 160 identifies an area ($Cb_{AC}$ or $Cr_{AC}$) in the bitstream where the AC identification signal is in the ON state, as the particular AC area corresponding to the last piece of AC component data in the data sequence of each block data. Thereafter, the color replacement unit 160 replaces encoded data in the identified particular AC area with encoded data representing that AC components of the blue color difference block data or the red color difference block data are all zero (see $Cb_{EOB}$ and $Cr_{EOB}$ as encoded data in the particular AC areas resulting from the replacement by the color replacement unit 160).

According to the JPEG system, it is possible to represent that AC components are all zero with a special code (EOB). Thus, the color replacement unit 160 deletes a partial AC area of the bitstream up to immediately before the AC identification signal changes to the ON state, and replaces the remaining part (i.e., the particular AC area) of the AC area in which the AC identification signal is in the ON state with the special code (EOB). Thereby, the color replacement unit 160 converts the data in the particular AC area into the encoded data representing that AC components are all zero, and transmits downstream the bitstream resulting from the conversion (replacement).

Further, the header output unit 170 inputs a common (same) header into the color output unit 180 and the monochrome output unit 190 before the encoded data begin to be input into the color output unit 180 and the monochrome output unit 190. As shown in FIG. 7, the header contains various kinds of information, such as a start marker (SOI), a DQT segment, a DRI segment, an SOF segment, a DHT segment, and an SOS segment, according to the JPEG format.

The color output unit 180 outputs the header input from the header output unit 170, and thereafter outputs image component data based on the bitstream of encoded data input from the encoding unit 150. Finally, the color output unit 180 outputs an end marker (EOI).

Specifically, the color output unit 180 includes a main data output unit 181 and a selector 185. The selector 185 switches data to be output therethrough, from data output from the header output unit 170 to data output from the main data output unit 181, in accordance with a point of time when a leading bit of the bitstream of encoded data comes to the selector 185.

The main data output unit 181 periodically inserts RST markers in the bitstream of encoded data input from the encoding unit 150. Then, the main data output unit 181 inputs, into the selector 185, the bitstream of encoded data with the RST markers periodically inserted therein, as image component data (so-called scanned data). Further, after outputting the image component data up to the end of the data, the main data output unit 181 inputs the end marker (EOI) into the selector 185.

The selector 185 serially outputs the header, the image component data, and the end marker. Thereby, a JPEG-format image frame is output as compressed color image data. Namely, the selector 185 outputs the image frame that contains JPEG segments and compressed color image components corresponding to image data to be processed, between the start marker and the end marker. The compressed color image data as output is written into the RAM 15 via the CPU 11 and a memory controller (not shown).

The monochrome output unit 190 outputs the header input from the header output unit 170, and thereafter outputs image component data based on the bitstream of encoded data input from the color difference replacement unit 160. Finally, the monochrome output unit 190 outputs the end marker (EOI).

Specifically, the monochrome output unit 190 includes a main data output unit 191 and a selector 195. The selector 195 switches data to be output therethrough, from data output from the header output unit 170 to data output from the main data output unit 191, in accordance with a point of time when a leading bit of the bitstream of encoded data comes to the selector 195.

The main data output unit 191 periodically inserts RST markers in the bitstream of encoded data input from the color difference replacement unit 160. Then, the main data output unit 191 inputs, into the selector 195, the bitstream of encoded data with the RST markers periodically inserted therein, as image component data. Further, after outputting the image component data up to the end thereof, the main data output unit 191 inputs the end marker (EOI) into the selector 195.

The selector 195 serially outputs the header, the image component data, and the end marker. Thereby, a JPEG-format image frame is output as compressed monochrome image data. Namely, the selector 195 outputs the image frame that contains JPEG segments and compressed monochrome image components, which correspond to image data to be processed and of which blue color difference components and red color difference components have been changed to zero, between the start marker and the end marker. The compressed monochrome image data as output is written into the RAM 15 in the same manner as the compressed color image data. The compressed color image data and the compressed monochrome image data written into the RAM 15 are processed by the CPU 11 and then provided, e.g., to the external device 3.

Hereinabove, the image reader 1 of the first illustrative embodiment has been described. According to the first illustrative embodiment, when the compressed color image data and the compressed monochrome image data are generated based on the image data to be processed, at least a sequence of operations from input of the block data to generation of the encoded data is achieved using common hardware circuit elements that include the frequency conversion unit 120, the quantization unit 130, the zigzag scanning unit 140, and the encoding unit 150.

Thus, according to the first illustrative embodiment, it is possible to more efficiently achieve miniaturization of processing circuit elements configured to perform operations up to generation of the encoded data, than when such processing circuit elements are separately provided for the compressed color image data and the compressed monochrome image data. Further, it is possible to reduce a buffer capacity required for the operations up to generation of the encoded data.

Consequently, according to the first illustrative embodiment, it is possible to manufacture a small-sized inexpensive image reader configured to provide compressed color image data and compressed monochrome image data to the external device 3 and/or the user.

When the image reader 1 is configured such that the operations up to generation of the encoded data are performed by processing circuit elements common to the compressed color image data and the compressed monochrome image data, each piece of quantized data having a fixed length is converted into a bit sequence having an unfixed length. Therefore, only by referring to the bitstream of encoded data, it is not possible to achieve code replacement of color difference components with zero values.

In the first illustrative embodiment, it is possible to achieve code replacement of color difference components with zero values, by generating in the encoding unit 150 the identification signals for identifying the luminance area, the color difference area, and DC areas and AC areas that need code replacement, in the bitstream of encoded data. Thus, according to the first illustrative embodiment, it is possible to provide an inexpensive and high-performance image reader 1.

[Second Illustrative Embodiment]

Subsequently, a second illustrative embodiment will be described. An image reader 1 of the second illustrative embodiment is different from the image reader 1 of the first illustrative embodiment in an operation of generating an AC identification signal by an identification signal generating unit 157 and a processing operation by a color difference replacement unit 160. With respect to the other configurations and processing operations except the above differences, the image reader 1 of the second illustrative embodiment is substantially the same as the first illustrative embodiment. Accordingly, in the following description, an explanation will be provided mainly about an operation of generating an AC identification signal by an identification signal generating unit 157 and a processing operation by a color difference replacement unit 160 in the second illustrative embodiment.

As shown in FIG. 8, the identification signal generating unit 157 of the second illustrative embodiment generates the same color identification signal and the same DC identification signal as the first illustrative embodiment. However, the identification signal generating unit 157 generates an AC identification signal for identifying a particular part (hereinafter referred to as a particular AC area) of the AC area corresponding to the AC component data in the datastream of quantized data. More specifically, the particular AC area referred to here is an area corresponding to a leading piece of AC component data in the data sequence of each block data.

FIG. 8 shows a relationship among the color identification signal, the DC identification signal, and the AC identification signal output from the encoding unit 150, the bitstream of encoded data, and a bitstream resulting from a process by the color difference replacement unit 160.

The identification signal generating unit 157 generates, as the AC identification signal, a signal that takes the ON state when the leading piece of AC component data in the data sequence in each block data is input into a DC differentiating unit 151 and takes the OFF state when data other than the leading piece of AC component data in the data sequence in each block data is input into the DC differentiating unit 151. Then, the identification signal generating unit 157 inputs the generated AC identification signal into the DC differentiating unit 151.

In response to the operations by the identification signal generating unit 157, as shown in FIG. 8, an entropy encoder 155 inputs, into the color difference replacement unit 160, the AC identification signal for identifying the particular AC area corresponding to the leading piece of AC component data in the data sequence of each block data.

In the same manner as the first illustrative embodiment, based on the color identification signal and the DC identification signal, the color difference replacement unit 160 replaces encoded data in each of the DC areas ($Cb_{DC}$ and $Cr_{DC}$) identified within the color difference area in the bitstream of encoded data with encoded data representing that a DC component is zero. Then, the color difference replacement unit 160 transmits downstream the data resulting from the replacement.

The color difference replacement unit 160 identifies an area, in which the AC identification signal is in the ON state, following each of the identified DC areas, as the particular AC area corresponding to the leading piece of AC component data in the data sequence of each block data. Further, the color difference replacement unit 160 replaces encoded data in the identified particular AC area with a special code (EOB) representing that AC components of the blue color difference block data or the red color difference block data are all zero. Thereafter, the color difference replacement unit 160 deletes an area of the bitstream up to immediately before the DC identification signal changes to the ON state.

Thereby, the color difference replacement unit 160 abandons codes (encoded data), outside the particular AC area, in each AC area within the color difference area of the bitstream, without transmitting the codes downstream. It is noted that the particular AC area is an area corresponding to the leading piece of AC component data in the data sequence of each block data.

Thus, in the second illustrative embodiment, the color difference replacement unit 160 replaces encoded data in the particular AC area corresponding to the leading piece of AC component data in the data sequence of each block data with the special code (EOB). Further, the color difference replacement unit 160 deletes the remaining part (other than the particular AC area) of the AC area corresponding to the AC component data. Thereby, the color difference replacement unit 160 replaces the color difference area in the bitstream of encoded data with codes corresponding to monochrome color difference data.

Hereinabove, the second illustrative embodiment has been described. According to the second illustrative embodiment, the monochrome output unit 190 is allowed to generate a JPEG-format image frame containing compressed monochrome image components, based on the bitstream of encoded data supplied from the color difference replacement unit 160, and output the generated image frame.

[Third Illustrative Embodiment]

Subsequently, a third illustrative embodiment will be described. An image reader 1 of the third illustrative embodiment is different from the image reader 1 of the first illustrative embodiment in the following points. First, the image reader 1 of the third illustrative embodiment includes an encoding unit 250 and a header output unit 270 that have different configurations from the encoding unit 150 and the header output unit 170 of the first illustrative embodiment. Second, the image reader 1 of the third illustrative embodiment includes a color difference deletion unit 260 instead of the color difference replacement unit 160 of the first illustrative embodiment. Except for the above differences, the image reader 1 of the third illustrative embodiment is substantially the same as the first illustrative embodiment. Accordingly, in the following description, an explanation will be provided mainly about configurations of the encoding unit 250, the color difference deletion unit 260, and the header output unit 270.

The image reader 1 of the third illustrative embodiment includes a JPEG compressing circuit 239 as shown in FIG. 9, instead of the aforementioned JPEG compressing circuit 39. In the JPEG compressing circuit 239, the encoding unit 250, the color difference deletion unit 260, and the header output unit 270 are used in place of the encoding unit 150, the color difference replacement unit 160, and the header output unit 170, respectively.

The encoding unit 250 has substantially the same configuration as the encoding unit 150. The encoding unit 250 outputs a bitstream of encoded data corresponding to the quantized data input from the zigzag scanning unit 140. The bitstream of encoded data output from the encoding unit 250 is substantially the same as the bitstream of encoded data output from the encoding unit 150 in the first illustrative embodiment. The bitstream of encoded data is input into the color difference deletion unit 260 and the color output unit 180.

The encoding unit 250 outputs only the color identification signal of the three identification signals (i.e., the color identification signal, the DC identification signal, and the AC identification signal), and inputs the color identification signal into the color difference deletion unit 260. The color identification signal is a signal synchronized with the bitstream of encoded data output from the encoding unit 250. Further, the color identification signal is a signal for identifying the luminance area and the color difference area in the bitstream of encoded data.

As shown in FIG. 10, the color difference deletion unit 260 deletes a bit sequence corresponding to the color difference area from the bitstream of encoded data input from the encoding unit 250, based on the color identification signal from the encoding unit 250.

Specifically, the color difference deletion unit 260 deletes the color difference area without transmitting the color difference area downstream. Meanwhile, the color difference deletion unit 260 does not delete and transmits encoded data in areas other than the color difference area downstream to the monochrome output unit 190.

The header output unit 270 includes a header-for-color generator 271 and a header-for-monochrome generator 275. The header-for-color generator 271 is configured to generate a header for color. The header-for-monochrome generator 275 is configured to generate a header for monochrome. The header output unit 270 inputs the header generated by the header-for-color generator 271 into the color output unit 180. The header output unit 270 inputs the header generated by the header-for-monochrome generator 275 into the monochrome output unit 190.

The header generated by each of the header-for-color generator 271 and the header-for-monochrome generator 275 contains various kinds of information, such as a start marker (SOI), a DQT segment, a DRI segment, an SOF segment, a DHT segment, and an SOS segment, according to the JPEG format. The SOF segment and the SOS segment contain respective parameters each representing the number of colors.

According to the JPEG format, the SOF segment contains a parameter Nf representing the number of colors in an image frame. The SOS segment contains a parameter Ns representing the number of colors in a scan (image component) area following the SOS segment.

The header-for-color generator 271 generates a header corresponding to compressed color image data for which the parameters Nf and Ns represent "three colors," and inputs the generated header into the color output unit 180. The header-for-monochrome generator 275 generates a header corresponding to compressed monochrome image data for which the parameters Nf and Ns represent "one color," and provides the generated header to the monochrome output unit 190.

As exemplified in the first illustrative embodiment, the compressed monochrome image data generated by replacement of the color difference components with zero values is regarded as three-color image data having the luminance (Y), the blue color difference (Cb), and the red color difference (Cr) as color components. In this case, the parameters Nf and Ns may represent "three colors" in the same manner as compressed color image data.

However, according to the third illustrative embodiment, the color difference deletion unit 260 deletes all the encoded data corresponding to the color difference area. Accordingly, the compressed monochrome image data output from the monochrome output unit 190 is one-color image data without any components corresponding to the blue color difference (Cb) or the red color difference (Cr).

Thus, in the third illustrative embodiment, the compressed monochrome image data does not have any data corresponding to the blue color difference (Cb) or the red color difference (Cr). In other words, the compressed monochrome image data has a different data structure from the compressed color image data. Hence, the header for the compressed monochrome image data needs to have the parameters Nf and Ns representing "one color." Therefore, in the third illustrative embodiment, the header output unit 270 is configured to generate the header for color and the header for monochrome.

The color output unit 180 outputs the header supplied from the header-for-color generator 271 via the selector 185. Thereafter, the color output unit 180 outputs image component data based on the bitstream of encoded data from the encoding unit 250, and an end marker. Thereby, the color output unit 180 outputs compressed color image data via the selector 185.

The monochrome output unit 190 outputs the header supplied from the header-for-monochrome generator 275 via the selector 195. Thereafter, the monochrome output unit 190 outputs image component data based on the bitstream of encoded data from the color difference deletion unit 260, and an end marker. Thereby, the monochrome output unit 190 outputs compressed monochrome image data via the selector 195.

In the first illustrative embodiment, each of the compressed color image data and the compressed monochrome image data is compressed image data having data of the luminance (Y), the blue color difference (Cb), and the red color difference (Cr). On the contrary, in the third illustrative embodiment, the compressed monochrome image data is output as compressed image data that has data of the luminance (Y) but does not have any data of the blue color difference (Cb) and the red color difference (Cr). The compressed color image data and the compressed monochrome image data output in the aforementioned manner are stored into the RAM 15 and provided, e.g., to the external device 3 in the same manner as exemplified in the first illustrative embodiment.

According to the third illustrative embodiment, the two types of headers have to be generated. Nonetheless, compared with the first illustrative embodiment, the image reader 1 of the third illustrative embodiment is not required to generate the DC identification signal or the AC identification signal. Therefore, the image reader 1 of the third illustrative embodiment needs not the replacement of color difference components with zero values based on the DC identification signal and the AC identification signal. Thus, according to the third illustrative embodiment, it is possible to reduce a circuit scale and manufacture a high-performance inexpensive image reader 1.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

In the aforementioned illustrative embodiments, JPEG compression of the image data to be processed is performed with specific hardware circuits (e.g., the JPEG compressing circuits 39 and 239). Nonetheless, the image reader 1 may be configured to perform JPEG compression by software processing. More specifically, the CPU 11 may be configured to actualize at least a part of JPEG compression (e.g., which may include operations by the aforementioned elements 110 to 195 shown in FIG. 2) by executing computer programs stored in the ROM 13.

In this case, the image reader 1 may be configured to perform operations (e.g., which may include operations by the aforementioned elements 110 to 150 shown in FIG. 2) up to generation of the encoded data by software processing that is applied in common to generation of the compressed color image data and the compressed monochrome image data. Additionally, the image reader 1 may be configured to perform operations (e.g., which may include operations by the aforementioned elements 160 to 195 shown in FIG. 2) following generation of the encoded data, by different types of processing that are adapted separately for the compressed color image data and the compressed monochrome image data, respectively.

According to the modification, it is possible to reduce an amount of arithmetic operations, in comparison with an image reader configured to execute different types of processing that are adapted separately for the compressed color image data and the compressed monochrome image data, from the stage of discrete cosine transformation (DCT). Thus, it is possible to efficiently generate the compressed color image data and the compressed monochrome image data.

Nonetheless, when the compressed color image data and the compressed monochrome image data are generated by pipeline processing using specific hardware circuits as exemplified in the aforementioned illustrative embodiments, it is possible to achieve high-speed generation of the compressed color image data and the compressed monochrome image data and reduce a load placed on the CPU 11.

What is claimed is:

1. An electronic apparatus comprising:
   a pixel block separator configured to separate target image data into a plurality of pixel blocks, and serially input luminance data and color difference data of each pixel block as individual pieces of block data, respectively;
   a quantizer configured to serially convert, into quantized data, each piece of the block data input from the pixel block separator, via execution of frequency conversion and quantization for each piece of the block data;
   an encoder configured to serially convert, into encoded data, each piece of the quantized data generated through the conversion by the quantizer, via entropy encoding of each piece of the quantized data;
   a color data generator configured to generate compressed color image data corresponding to the target image data, using the encoded data generated through the conversion by the encoder; and
   a monochrome data generator configured to generate compressed monochrome image data corresponding to the target image data, using the encoded data generated through the conversion by the encoder, by performing one of:

deleting particular pieces of encoded data corresponding to the color difference data from a data sequence of the encoded data generated through the conversion by the encoder; and replacing the particular pieces of encoded data corresponding to the color difference data with encoded data corresponding to monochrome color difference data, wherein the encoder is further configured to, after converting each piece of the quantized data via the entropy encoding into the encoded data, allocate the encoded data both to the color data generator configured to generate the compressed color image data and to the monochrome data generator configured to generate the compressed mono chrome image data.

2. The electronic apparatus according to claim 1,
wherein the encoder is configured to:
   serially convert, into the encoded data, each piece of the quantized data input from the quantizer, and output a bitstream of the encoded data; and
   output an identification signal in parallel with the bitstream of the encoded data, the identification signal being configured to identify a color difference area corresponding to the color difference data in the bitstream of the encoded data, and
wherein the monochrome data generator is configured to:
   identify the color difference area in the bitstream of the encoded data based on the identification signal; and
   generate the compressed monochrome image data by replacing the identified color difference area with the encoded data corresponding to the monochrome color difference data.

3. The electronic apparatus according to claim 1,
wherein the quantizer is configured to serially output, as the quantized data, a single piece of direct-current component data and a plurality of pieces of alternate-current component data, on the basis of each piece of the block data,
wherein the encoder is configured to:
   serially convert, into the encoded data, each of the quantized data input from the quantizer, and output a bitstream of the encoded data; and
   output one or more identification signals in parallel with the bitstream of the encoded data, the one or more identification signals being configured to identify a color difference area and a direct-current area, the color difference area corresponding to the color difference data in the bitstream of the encoded data, the direct-current area corresponding to the direct-current component data in the bitstream of the encoded data, and
wherein the monochrome data generator is configured to generate the compressed monochrome image data by:
   identifying the direct-current area in the color difference area in the bitstream of the encoded data, based on the one or more identification signals;
   replacing the identified direct-current area with encoded data representing that a direct-current component of the color difference data is zero; and
   replacing an alternate-current area corresponding to the plurality of pieces of alternate-current component data with encoded data representing that alternate-current components of the color difference data are zero.

4. The electronic apparatus according to claim 3,
wherein the one or more identification signals are configure to identify a particular alternate-current area corresponding to a last piece of alternate-current component data in the alternate-current area in the bitstream of the encoded data, and
wherein the monochrome data generator is configured to generate the compressed monochrome image data by:
   identifying the particular alternate-current area in the alternate-current area in the bitstream of the encoded data, based on the one or more identification signals;
   deleting a remaining part of the alternate-current area other than the identified particular alternate-current area; and
   replacing the identified particular alternate-current area with encoded data representing that all of the alternate-current components of the color difference data are zero.

5. The electronic apparatus according to claim 3,
wherein the one or more identification signals are configured to identify a particular alternate-current area corresponding to a leading piece of alternate-current component data in the alternate-current area in the bitstream of the encoded data, and
wherein the monochrome data generator is configured to generate the compressed monochrome image data by:
   identifying the particular alternate-current area in the alternate-current area in the bitstream of the encoded data, based on the one or more identification signals;
   replacing the identified particular alternate-current area with encoded data representing that all of the alternate-current components of the color difference data are zero; and
   deleting a remaining part of the alternate-current area other than the identified particular alternate-current area.

6. The electronic apparatus according to claim 2,
wherein the color data generator is configured to generate the compressed color image data by adding first auxiliary data to first main data, the first main data comprising image component data based on the bitstream of the encoded data, the first auxiliary data comprising information that defines a data structure of the first main data,
wherein the monochrome data generator is configured to generate the compressed monochrome image data by adding second auxiliary data to second main data, the second main data comprising image component data based on the bitstream of the encoded data, the second auxiliary data comprising information that defines a data structure of the second main data, and
wherein the electronic apparatus further comprises an auxiliary data providing unit configured to:
   generate common auxiliary data configured as the first auxiliary data and the second auxiliary data; and
   provide the common auxiliary data to the color data generator and the monochrome data generator.

7. The electronic apparatus according to claim 1,
wherein the encoder is configured to:
   serially convert, into the encoded data, each of the quantized data input from the quantizer, and output a bitstream of the encoded data; and
   output an identification signal in parallel with the bitstream of the encoded data, the identification signal being configured to identify a color difference area corresponding to the color difference data in the bitstream of the encoded data, and
wherein the monochrome data generator is configured to:
   identify the color difference area in the bitstream of the encoded data based on the identification signal; and generate the compressed monochrome image data by deleting the identified color difference area.

8. The electronic apparatus according to claim 7,
wherein the color data generator is configured to generate the compressed color image data by adding first auxiliary data to first main data, the first main data comprising image component data based on the bitstream of the encoded data, the first auxiliary data comprising information that defines a data structure of the first main data,
wherein the monochrome data generator is configured to generate the compressed monochrome image data by adding second auxiliary data to second main data, the second main data comprising image component data based on the bitstream of the encoded data, the second auxiliary data comprising information that defines a data structure of the second main data, and
wherein the electronic apparatus further comprises an auxiliary data providing unit configured to:
generate the first auxiliary data and the second auxiliary data;
provide the first auxiliary data to the color data generator; and
provide the second auxiliary data to the monochrome data generator.

9. The electronic apparatus according to claim 1,
wherein the encoder is configured to:
serially convert, into the encoded data, each piece of the quantized data generated through the quantization for each piece of the block data, in a pipeline processing system; and
allocate the encoded data to the color data generator and the monochrome data generator, as a same bitstream.

10. The electronic apparatus according to claim 1, further comprising: a processor; and a memory storing processor-executable instructions configured to, when executed by the processor, cause the processor to provide the pixel block separator, the quantizer, the encoder, the color data generator, and the monochrome data generator.

11. A method adapted to be implemented on an electronic apparatus, the method comprising:
separating target image data into a plurality of pixel blocks;
serially inputting luminance data and color difference data of each pixel block as individual pieces of block data, respectively;
serially converting each piece of the block data into quantized data via execution of frequency conversion and quantization for each piece of the block data;
serially converting each piece of the quantized data into encoded data via entropy encoding of each piece of the quantized data;
generating compressed color image data corresponding to the target image data, using the encoded data; and
generating compressed monochrome image data corresponding to the target image data, using the encoded data, by performing one of:
deleting particular pieces of encoded data corresponding to the color difference data from a data sequence of the encoded data generated through the entropy encoding of each piece of the quantized data; and
replacing the particular pieces of encoded data corresponding to the color difference data with encoded data corresponding to monochrome color difference data,
wherein after converting each piece of the quantized data via the entropy encoding into the encoded data, allocate the encoded data both to a color data generator configured to generate the compressed color image data and to a monochrome data generator configured to generate the compressed mono chrome image data.

12. The method according to claim 11, further comprising:
outputting a bitstream of the encoded data generated through the entropy encoding of each piece of the quantized data;
outputting an identification signal in parallel with the bitstream of the encoded data, the identification signal being configured to identify a color difference area corresponding to the color difference data in the bitstream of the encoded data;
identifying the color difference area in the bitstream of the encoded data based on the identification signal; and
generating the compressed monochrome image data by replacing the identified color difference area with the encoded data corresponding to the monochrome color difference data.

13. The method according to claim 11, further comprising:
serially outputting, as the quantized data, a single piece of direct-current component data and a plurality of pieces of alternate-current component data, on the basis of each piece of the block data;
serially converting each of the quantized data into the encoded data, and outputting a bitstream of the encoded data;
outputting one or more identification signals in parallel with the bitstream of the encoded data, the one or more identification signals being configured to identify a color difference area and a direct-current area, the color difference area corresponding to the color difference data in the bitstream of the encoded data, the direct-current area corresponding to the direct-current component data in the bitstream of the encoded data; and
generating the compressed monochrome image data by:
identifying the direct-current area in the color difference area in the bitstream of the encoded data, based on the one or more identification signals;
replacing the identified direct-current area with encoded data representing that a direct-current component of the color difference data is zero; and
replacing an alternate-current area corresponding to the plurality of pieces of alternate-current component data with encoded data representing that alternate-current components of the color difference data are zero.

14. The method according to claim 13,
wherein the one or more identification signals are configured to identify a particular alternate-current area corresponding to a last piece of alternate-current component data in the alternate-current area in the bitstream of the encoded data, and
wherein the method further comprises generating the compressed monochrome image data by:
identifying the particular alternate-current area in the alternate-current area in the bitstream of the encoded data, based on the one or more identification signals;
deleting a remaining part of the alternate-current area other than the identified particular alternate-current area; and replacing the identified particular alternate-current area with encoded data representing that all of the alternate-current components of the color difference data are zero.

15. The method according to claim 13,
wherein the one or more identification signals are configured to identify a particular alternate-current area corresponding to a leading piece of alternate-current component data in the alternate-current area in the bitstream of the encoded data, and
wherein the method further comprises generating the compressed monochrome image data by:
   identifying the particular alternate-current area in the alternate-current area in the bitstream of the encoded data, based on the one or more identification signals;
   replacing the identified particular alternate-current area with encoded data representing that all of the alternate-current components of the color difference data are zero; and
   deleting a remaining part of the alternate-current area other than the identified particular alternate-current area.

16. The method according to claim 12,
wherein the compressed color image data is formed with first auxiliary data added to first main data, the first main data comprising image component data based on the bitstream of the encoded data, the first auxiliary data comprising information that defines a data structure of the first main data,
wherein the compressed monochrome image data is formed with second auxiliary data added to second main data, the second main data comprising image component data based on the bitstream of the encoded data, the second auxiliary data comprising information that defines a data structure of the second main data, and
wherein the method further comprises:
   generating common auxiliary data configured as the first auxiliary data and the second auxiliary data;
   adding, to the first main data, the common auxiliary data as the first auxiliary data, and generating the compressed color image data; and
   adding, to the second main data, the common auxiliary data as the second auxiliary data, and generating the compressed monochrome image data.

17. The method according to claim 11, further comprising:
   serially converting each of the quantized data into the encoded data, and output a bitstream of the encoded data; and
   outputting an identification signal in parallel with the bitstream of the encoded data, the identification signal being configured to identify a color difference area corresponding to the color difference data in the bitstream of the encoded data;
   identifying the color difference area in the bitstream of the encoded data based on the identification signal; and
   generating the compressed monochrome image data by deleting the identified color difference area.

18. The method according to claim 17,
wherein the compressed color image data is formed with first auxiliary data added to first main data, the first main data comprising image component data based on the bitstream of the encoded data, the first auxiliary data comprising information that defines a data structure of the first main data,
wherein the compressed monochrome image data is formed with second auxiliary data added to second main data, the second main data comprising image component data based on the bitstream of the encoded data, the second auxiliary data comprising information that defines a data structure of the second main data, and
wherein the method further comprises:
   generating the first auxiliary data and the second auxiliary data;
   adding the first auxiliary data to the first main data, and generating the compressed color image data; and
   adding the second auxiliary data to the second main data, and generating the compressed color image data.

19. The method according to claim 11, further comprising:
   serially converting, into the encoded data, each piece of the quantized data generated through the quantization for each piece of the block data, in a pipeline processing system; and
   allocating the encoded data to the generating the compressed color image data and the generating the compressed monochrome image data, as a same bitstream.

20. A non-transitory computer-readable medium storing computer-readable instructions configured to, when executed by a processor, cause the processor to:
   separate target image data into a plurality of pixel blocks;
   serially input luminance data and color difference data of each pixel block as individual pieces of block data, respectively;
   serially convert each piece of the block data into quantized data via execution of frequency conversion and quantization for each piece of the block data;
   serially convert each piece of the quantized data into encoded data via entropy encoding of each piece of the quantized data;
   generate compressed color image data corresponding to the target image data, using the encoded data; and
   generate compressed monochrome image data corresponding to the target image data, using the encoded data, by performing one of:
      deleting particular pieces of encoded data corresponding to the color difference data from a data sequence of the encoded data generated through the entropy encoding of each piece of the quantized data; and
   replacing the particular pieces of encoded data corresponding to the color difference data with encoded data corresponding to monochrome color difference data,
wherein after converting each piece of the quantized data via the entropy encoding into the encoded data, allocate the encoded data both to a color data generator configured to generate the compressed color image data and to a monochrome data generator configured to generate the compressed mono chrome image data.

* * * * *

UNITED STATES PATENT AND TRADEMARK OFFICE
CERTIFICATE OF CORRECTION

PATENT NO. : 9,854,255 B2
APPLICATION NO. : 14/669255
DATED : December 26, 2017
INVENTOR(S) : Jyunji Maeda Page 1 of 1

It is certified that error appears in the above-identified patent and that said Letters Patent is hereby corrected as shown below:

Column 19, Claim 4, Lines 66-67 should read:
wherein the one or more identification signals are configured to identify a particular alternate-current area Signed and Sealed this
Twenty-ninth Day of May, 2018

Andrei Iancu
*Director of the United States Patent and Trademark Office*